United States Patent [19]

Semon

[11] 3,712,333

[45] Jan. 23, 1973

[54] FLUID PRESSURE COMPENSATING REGULATOR

[76] Inventor: Albert L. Semon, 11 Eliot Place, Short Hills, N.J. 07078

[22] Filed: Sept. 23, 1970

[21] Appl. No.: 74,616

[52] U.S. Cl. ..........137/498, 137/116.5, 137/505.41, 138/45
[51] Int. Cl. .............................................F16k 17/22
[58] Field of Search..........137/116.5, 505.11, 505.12, 137/505.41, 505.42, 505.15, 505.14, 498; 138/45

[56] References Cited

UNITED STATES PATENTS

| | | |
|---|---|---|
| 2,764,183 | 9/1956 | Gollehon................................138/45 |
| 2,768,643 | 10/1956 | Acomb............................137/505.42 |
| 2,899,979 | 8/1959 | Dahl........................................138/45 |
| 2,979,067 | 4/1961 | Kern................................137/505.41 |
| 3,166,500 | 1/1965 | Noakes..............................138/45 X |
| 2,731,975 | 1/1956 | Boals................................137/116.5 |
| 2,747,607 | 5/1956 | Matasovic ..................137/505.11 X |

FOREIGN PATENTS OR APPLICATIONS

| | | |
|---|---|---|
| 552,052 | 1/1923 | France ............................137/505.42 |
| 1,263,971 | 5/1961 | France ............................137/116.5 |

*Primary Examiner*—Harold W. Weakley
*Attorney*—John A. Seifert

[57] ABSTRACT

This invention relates to a pressure regulator utilizing a compensating valve seat to maintain the outlet pressure substantially constant even though the inlet pressure is decreased.

3 Claims, 7 Drawing Figures

PATENTED JAN 23 1973 3,712,333

INVENTOR
ALBERT L. SEMON
BY
John A. Seifert
ATTORNEY

INVENTOR
ALBERT L. SEMON
BY
John A. Seifert
ATTORNEY 3,712,333

FLUID PRESSURE COMPENSATING REGULATOR

The present invention is concerned in providing a regulator designed primarily for controlling the flow of carbon dioxide gas and oxygen and maintaining a desired outlet pressure regardless of a drop in the inlet pressure.

No prior art is known to the applicant disclosing his concept of the invention.

This invention provides a compensating valve seat having an orifice which is smaller at a pressure of 1,000 pounds per square inch than at a pressure of 100 pounds per square inch. In the use of this valve seat, the manual pressure exerted to actuate a valve from this seat would be practically the same at 100 pounds per square inch as at 1,000 pounds per square inch at the inlet side of the valve. When the regulator is set at any desired pressure, for instance, 50 pounds per square inch, as the inlet pressure is gradually lowered, the 50 pounds per square inch will be maintained with a variation of slightly more than 1 pound per square inch as the inlet pressure is reduced to 100 pounds per square inch.

N—380—8 was originally produced by the Winchester Repeating Arms Company for use with carbon dioxide guns.

The regulator is used continuously with carbon dioxide gas causing the regulator to be coated with ice which will not affect the operation thereof due to the arrangement of parts of said regulator.

In the accompanying drawings:

FIG. 1 is an elevational exterior view of the regulator;

FIG. 3 is a sectional view taken on the line 3—3 of FIG. 2 looking in the direction of the arrows;

Figure 4:
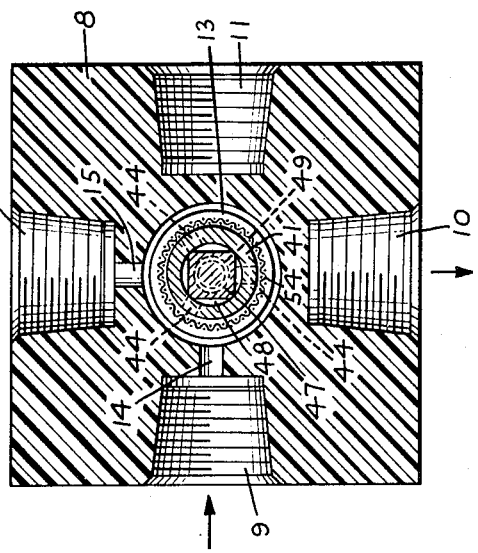
FIG. 4 is a sectional view taken on the line 4—4 of FIG. 3 looking in the direction of the arrows.
Figure 5:
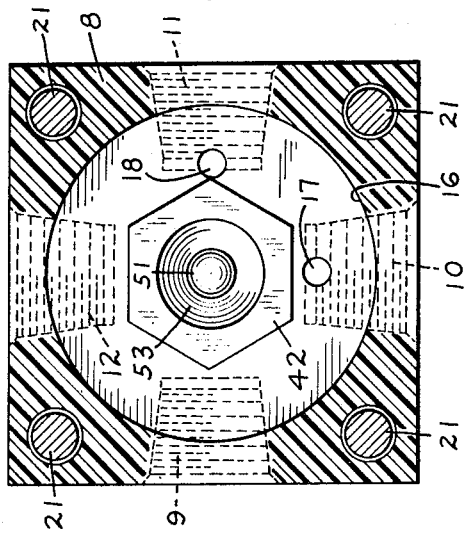
FIG. 5 is a sectional view taken on the line 5—5 of FIG. 3 looking in the direction of the arrows.

The embodiment of the invention comprises a two part casing, one part 8 being square in cross-section and provided with tapped openings 9, 10, 11 and 12, one in each side of the casing part 8 extended partially into said casing part 8. A well 13 is formed in the casing part 8 centrally of the terminating ends of the openings 9, 10, 11 and 12, and the openings 9 and 12 being in communication with said well 13 by ports 14 and 15, respectively, as shown in FIGS. 3 and 5. Above the openings 9, 10, 11 and 12, the casing part 8 is provided with a circular recess 16 communicating with the well 13 and with the openings 10 and 11 through ports 17 and 18, respectively, as shown in FIGS. 3 and 4.

The other casing part 19 is of cylindrical shape with the lower portion flanged and squared, as at 20, to mate with the wall of the recess 16. The casing parts 8 and 19 are secured together by bolts 21. The flanged portion 20 forms with the recess 16 a chamber for a diaphragm 22 having the peripheral edge portion clamped between the casing parts 8 and 19, as shown in FIG. 3. The center of the diaphragm 22 is reinforced by a plate 23 clamped to the upper surface of the diaphragm 22 by a bolt 24 having its head abutting the lower surface of the diaphragm 22 and its shank extended through the diaphragm 22 and the plate 23 and tightened by a nut 25. The casing part 19 and the diaphragm 22 forms a chamber 26 for a spring 27 for adjusting low pressure, said spring 27 having its lower end resting on the plate 23 and its upper end abutting a button 28 having a tubular shank 29 and screwed on an adjusting screw 30 having a shoulder 31 rotatably supported in a housing 32 by two nylon washers 33 confined by a bottom wall 34 of the housing 32 and a shoulder 35 in an intermediate portion of the housing 32. The bottom wall 34 of the housing 32 is an annular plate secured in the housing by peening an edge of the housing 32 over the plate, as shown at 36 in FIG. 3. The end portion of the adjusting screw 30 is provided with a hexagonal head 37 to facilitate adjustment of said screw 30. To lock the screw 30 in its adjusted position, the hexagonal head 37 is engaged by packing material 38 compressed by a lock nut 39 screwed in the housing 32. The inner wall of the spring chamber 26 is of hexagonal formation, as shown in dotted lines in FIG. 2 and in full lines in FIG. 3, as at 40, and the button 28 is of a corresponding hexagonal shape so that said button 28 will move longitudinally of the spring chamber 26 by the adjusting screw 30 without rotation.

Figure 7:
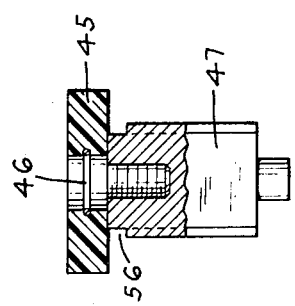
FIG. 7 is a sectional view, on an enlarged scale, of the valve seat under load as shown by the position of the valve.
Figures 2, 6:
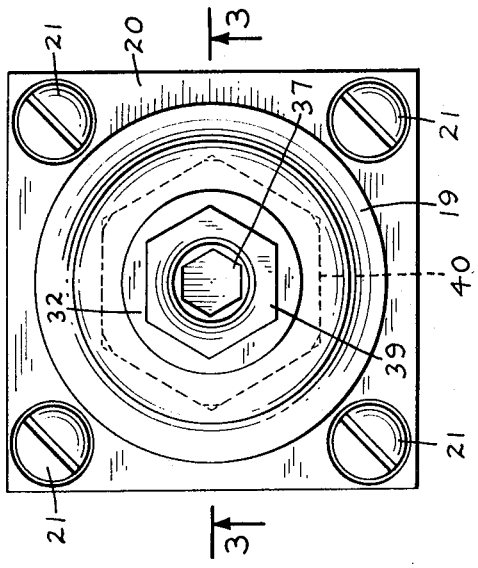
FIG. 2 is a top plan view of the regulator.
FIG. 6 is a sectional view, on an enlarged scale, of the valve seat under no load, as shown by the position of the valve.

The well 13 of the casing part 8 is provided with a valve chamber comprising a tubular housing 41 closed at the bottom and open at the top and supported in the well 13 by a valve seat housing 42 screwed in the well 13 and on the open top portion of the housing 41, and said housing 42 having a head abutting the bottom wall of the recess 16 with an O-ring 43 sealing the engagement between the head of the housing 42 and the bottom wall of the recess 16, as shown in FIG. 3. The side wall of the housing 41 adjacent the closed bottom is provided with spaced ports 44 for the flow of high pressure fluid from the port 14 into the valve chamber. At the open top of the housing 41, there is provided a valve seat comprising a ring 45 mounted in the housing 42 and of a material to contract under high pressure and withstand the effect of carbon dioxide gas. Also the orifice of the valve seat 45 varies in diameter from 0.062 to 0.093 of an inch, as pressure changes occur. The valve seat 45 is yieldingly urged to its extended or no load position by a split annular spring 46 engaged in the orifice of said valve seat 45, as shown in FIGS. 3, 6 and 7. The spring 46 slightly overlaps itself at low pressure and increases the overlapment as the pressure increases. The spring 46 prevents the valve seat 45 from assuming a fixed position when under constant load.

The valve seat 45 is closed by a valve in the form of a block 47 of square shape in cross section to form with the circular bore of the housing 41 longitudinal passages 48, as shown in FIG. 5, for the fluid flow in the housing 41 to the valve seat 45. The flat top of the valve 47 is reduced, as at 56, to increase the area of discharge of the fluid under high pressure against the valve seat 45. The corners of the valve 47 slidably engage the bore of the housing 41. The valve 47 is yieldingly urged toward the valve seat 45 by a spring 49 compressed between the closed bottom of the housing 41 and the bottom of the valve 47.

The valve 47 is actuated to open position by the flexing of the diaphragm 22 under the influence of the spring 27 and the low pressure in the diaphragm chamber 16. This is accomplished by an extension projecting from the valve 47 through the valve seat 45 and the housing 42. Said extension is in the form of a stem 50 secured in the valve 47 and having a ball 51 contacting an O-ring 52 in the bolt 24. The head of the valve seat housing 42 is provided with an inverted conical recess 53 to permit movement of the ball 51.

An annular screen 54 is clamped between the lower end of the valve seat housing 42 and the closed bottom of the valve housing 41 to clean the fluid passing from the port 14 to the ports 44.

The spring chamber 26 is vented through a port 55 in the casing part 19, as shown in FIG. 3. The port 55 also vents pressure that is in excess of the setting of the adjusting spring 27 coming between the ball 51 and the O-ring 52.

In the operation of the regulator, the tapped opening 9 is connected to a source of high pressure, not shown, and the tapped opening 10 is connected to a device receiving fluid under a desired low pressure, not shown. The diaphragm 22 is adjusted to permit the flow of fluid of the desired pressure. The tapped opening 11 is connected to a low pressure gauge, not shown, and the tapped opening 12 is connected to a high pressure gauge, not shown. It is to be understood that the tapped openings 11 and 12 can be omitted without departing from the scope of the present invention. The high pressure entering the tapped opening 9 and passing through ports 14 and 44, and the passages 48 will contract the valve seat 45 and its spring 46 as shown in FIG. 7. When the high pressure (inlet supply) is reduced and finally exhausted a condition as shown in FIG. 6 exists, where there will be no pressure exerted on valve 47 and the load on the valve seat 45 and its spring 46 will be relieved.

Having thus described my invention, I claim:

1. In a fluid pressure compensating regulator, a casing having an inlet and an outlet; a valve chamber interposed between the said inlet and outlet and having a communication with the inlet; a diaphragm chamber having communications with the valve chamber and the outlet; a valve seat in the communication between the valve chamber and the diaphragm chamber and arranged to contract at its seating contact point under high pressure and to expand when the pressure is decreased; a valve of square shape slidable in the valve chamber, yieldingly urged toward the valve seat and having an extension projecting into the diaphragm chamber; and a diaphragm in the diaphragm chamber in contact with the valve extension.

2. A fluid pressure compensating regulator as claimed in claim 1, wherein the valve seat is of resilient material, having an orifice surrounded by a split annular spring that slightly overlaps at low pressure and the overlapment increases as the pressure increases.

3. A fluid pressure compensating regulator as claimed in claim 2, wherein the valve seat is flat and in contact with the flat surface of the valve.

* * * * *